United States Patent [19]

Nolan, Jr. et al.

[11] 4,218,222
[45] Aug. 19, 1980

[54] METHOD OF CHARGING SOLIDS INTO COAL GASIFICATION REACTOR

[75] Inventors: John T. Nolan, Jr.; Matthew A. McMahon; Richard V. Kessler; Roger J. Corbeels, all of Wappingers Falls, N.Y.

[73] Assignee: Texaco Inc., White Plains, N.Y.

[21] Appl. No.: 940,797

[22] Filed: Sep. 7, 1978

[51] Int. Cl.² .............................................. C10J 3/16
[52] U.S. Cl. ................................... 48/202; 48/86 R; 44/13; 425/202; 264/118; 264/142; 264/500; 414/292
[58] Field of Search ............... 48/210, 86 R, 202, 206, 48/197 R; 425/202, 7; 264/12, 118, 142, 164, 209, 500, 570; 44/13; 214/17 B; 302/30, 19; 202/262; 406/61; 414/292

[56] References Cited

U.S. PATENT DOCUMENTS

| 148,527 | 3/1874 | Tisdale | 425/202 |
|---|---|---|---|
| 1,751,624 | 3/1930 | Du Brul | 264/500 |
| 1,828,586 | 10/1931 | Archbald | 44/13 |
| 1,887,149 | 11/1932 | Flodin et al. | 44/13 |
| 2,579,398 | 12/1951 | Roetheli | 48/202 |
| 3,036,906 | 5/1962 | Zellerhoff et al. | 48/63 |
| 3,104,020 | 9/1963 | Klapp | 214/17 B |
| 3,231,639 | 1/1966 | Mabru | 264/12 |
| 4,043,717 | 8/1977 | Riano | 425/7 |

FOREIGN PATENT DOCUMENTS 501996  5/1954  Canada ................................. 48/206

Primary Examiner—S. Leon Bashore
Assistant Examiner—Michael Goldman
Attorney, Agent, or Firm—Carl G. Ries; Robert A. Kulason; Henry C. Dearborn

[57] ABSTRACT

An extruder for feeding finely divided solids. And, in combination therewith, means for using gas in various ways to repulverize the finely divided solids. It lends itself to a procedure for continuously charging finely divided solids with water into a high pressure reactor. The high pressure is inherently contained, and the solids are repulverized for use in a reaction.

5 Claims, 11 Drawing Figures

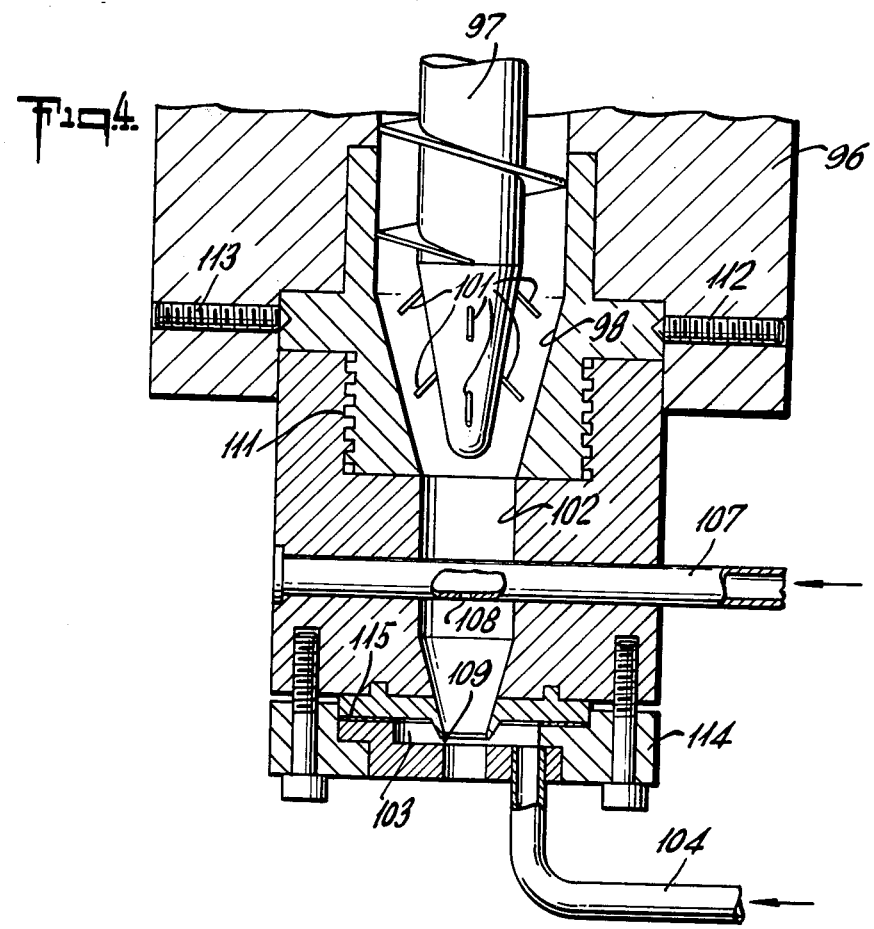
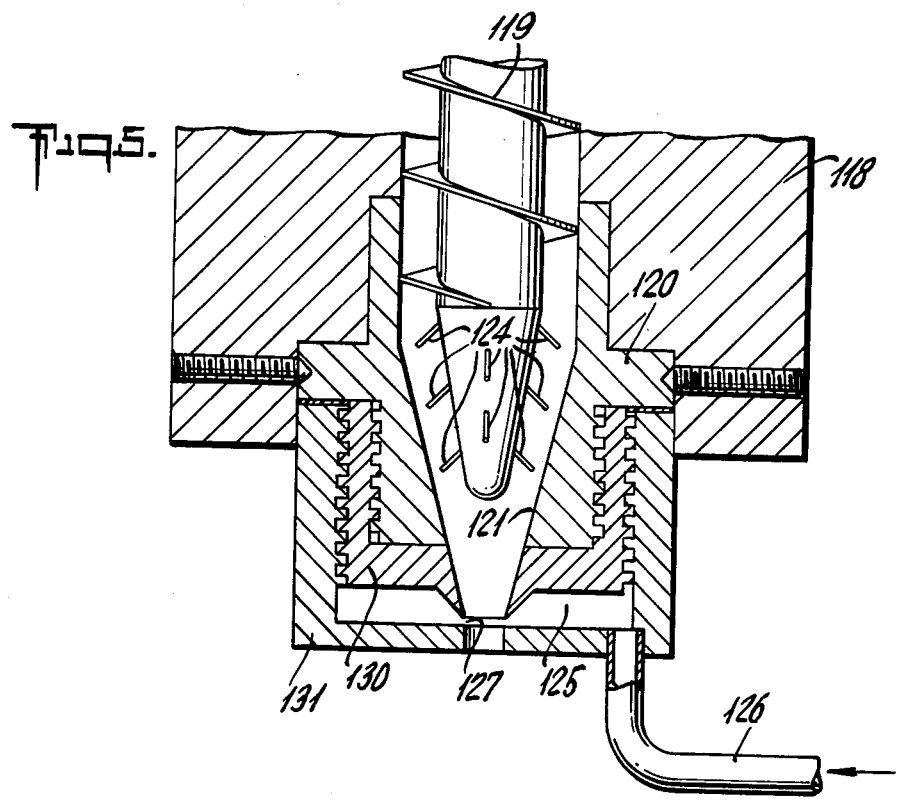

METHOD OF CHARGING SOLIDS INTO COAL GASIFICATION REACTOR

BACKGROUND OF THE INVENTION

1. Field of the Invention

This invention concerns coal gasification in general and, more specifically, deals with an extruder for general application where the material extruded is a finely divided solid that is repulverized upon exit from the extruder. It also concerns a method of using an extruder for introducing pulverized solids to a high pressure reactor.

2. Description of the Prior Art

Extruders per se are, of course, well known for various uses, e.g. the U.S. Pat. Nos. 3,950,122 and 4,021,523. And, screw feed pumps (in the nature of extruders) have been suggested for feeding coal in a gasification process, as exemplified by U.S. Pat. No. 3,775,071. But, the latter involved a plurality of stages of feeding the coal in the form of a slurry, which was done in order to feed powdered coal into a high pressure reactor. However, such arrangements have not dealt with the need for a simple yet workable feeding arrangement for continuously feeding powdered coal into a high pressure reactor, particularly for coal gasification or the like reaction, therewith.

Extruder type structures have been suggested in U.S. Pat. Nos. 3,862,594 and 3,976,548 for feeding solid materials into a high pressure chamber. However, they have involved a mechanical chopping of the compacted solids, in the one case, or heating to plastic-like condition of the solids in the other case. Consequently, neither of these arrangements is without its drawbacks.

Thus, it is an object of this invention to provide an extruder combination for feeding a finely divided solid and using a gas at the exit of the extrusion to repulverize the solids in a high pressure atmosphere.

Another object of the invention is to provide a procedure for charging finely divided solids continuously into a high pressure reactor, in a novel manner. The combination provides for containing a high pressure by the inherent action of an extruder, while repulverizing the solids for use in a reaction in the container.

SUMMARY OF THE INVENTION

Briefly, the invention concerns an extruder for feeding a finely divided solid into a high pressure chamber for reaction therein. It comprises in combination a helical screw conveyor with means for feeding said finely divided solid thereto, and a nozzle operatively associated with said conveyor. The said nozzle comprises a tapered passageway for compacting said finely divided solid for forming a barrier against said high pressure, and a die for shaping said compacted solid extrudate. The nozzle also comprises means for using gas to break up said compacted extrudate upon exit from said die.

Again briefly, the invention relates to a method applicable to coal gasification or the like, which employs a high pressure reactor. The method is one for charging solids into the reactor in a continuous manner, and it comprises the steps of feeding said solids in a finely divided form with about 15-40 percent by weight of water through an extruder to form an extrudate capable of withstanding said reactor pressure at the discharge end of said extruder. It also comprises the step of stirring said extrudate at said discharge end of said extruder to prevent blocking thereof and repulverizing said extrudate upon discharge from said discharge end for reacting to produce a product gas mixture.

Again briefly, the invention is in combination with a high pressure reactor for coal gasification or the like and includes means for continuously feeding powdered coal into said reactor near the top thereof. It comprises extrusion means for extruding said powdered coal, and means for injecting a reaction gas in cooperation with said extrusion for breaking up said extrudate and mixing with said reaction gas.

Once more briefly, the invention is in combination with a high pressure reactor for coal gasification or the like and concerns means for continuously feeding powdered coal into said reactor near the top thereof. It comprises extrusion means, which in turn comprises a helical screw feed section for feeding said powdered coal; and, a die section having a hollow circular cross section shape with thin walls. The means for continuously feeding powdered coal also comprises means for injecting a reaction gas in cooperation with said extrusion for breaking up said extrudate and mixing with said reaction gas. The latter injecting means comprises annular means for directing a jet of said reaction gas radially inward against said thin walls.

Once again briefly, the invention is related to coal gasification or the like, which employs a high pressure reactor. It concerns a method of charging solids into the reactor in a continuous manner, which method comprises the steps of feeding said solids in a finely divided form with about 15-40 percent by weight of water through an extruder to form an extrudate capable of withstanding said reactor pressure at the discharge end of said extruder. It also comprises the steps of stirring said extrudate at said discharge end of said extruder to prevent blocking thereof, and repulverizing said extrudate upon discharge from said discharge end by directing a jet of reactant gas radially inward against said extrudate.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 4 is a schematic illustration partly in cross section, showing another embodiment of a die and extruder, with two different reaction gas inlets;

FIG. 5 is a schematic cross sectional view of yet another modification according to the invention;

DESCRIPTION OF THE PREFERRED EMBODIMENTS

In connection with developing more efficient ways of using old energy sources, there has been considerable interest in using coal as a source of energy in connection with gasification thereof. However, known commercial processes are low pressure systems which are in general less efficient than high pressure processes which are being developed. But, high pressure coal gasification processes have a problem that relates to charging the coal to the reactor. A conventional charging arrangement is the use of a lock hopper such as was known in one of the old commercial low pressure processes. Other arrangements have used a water slurry and pumped the coal. However, each of these arrangements have had difficulties such as sealing and wear which has been encountered with lock hoppers. Also, the slurry arrangements have required the use of an excessive amount of water. The latter has seriously reduced the thermal efficiency of the process in which such a charging system was used.

It has been discovered that by using an extruder in combination with a high pressure reactor, the charging of powdered coal can be accomplished in a very satisfactory manner which overcomes the prior difficulties. Thus, it is expected that with an extruder system according to this invention, a coal with water mixture of 30–40 percent by weight of water and possibly even as little as 15 percent by weight of water may be charged with the extrudate being repulverized for reaction in the reactor vessel.

Figure 1:
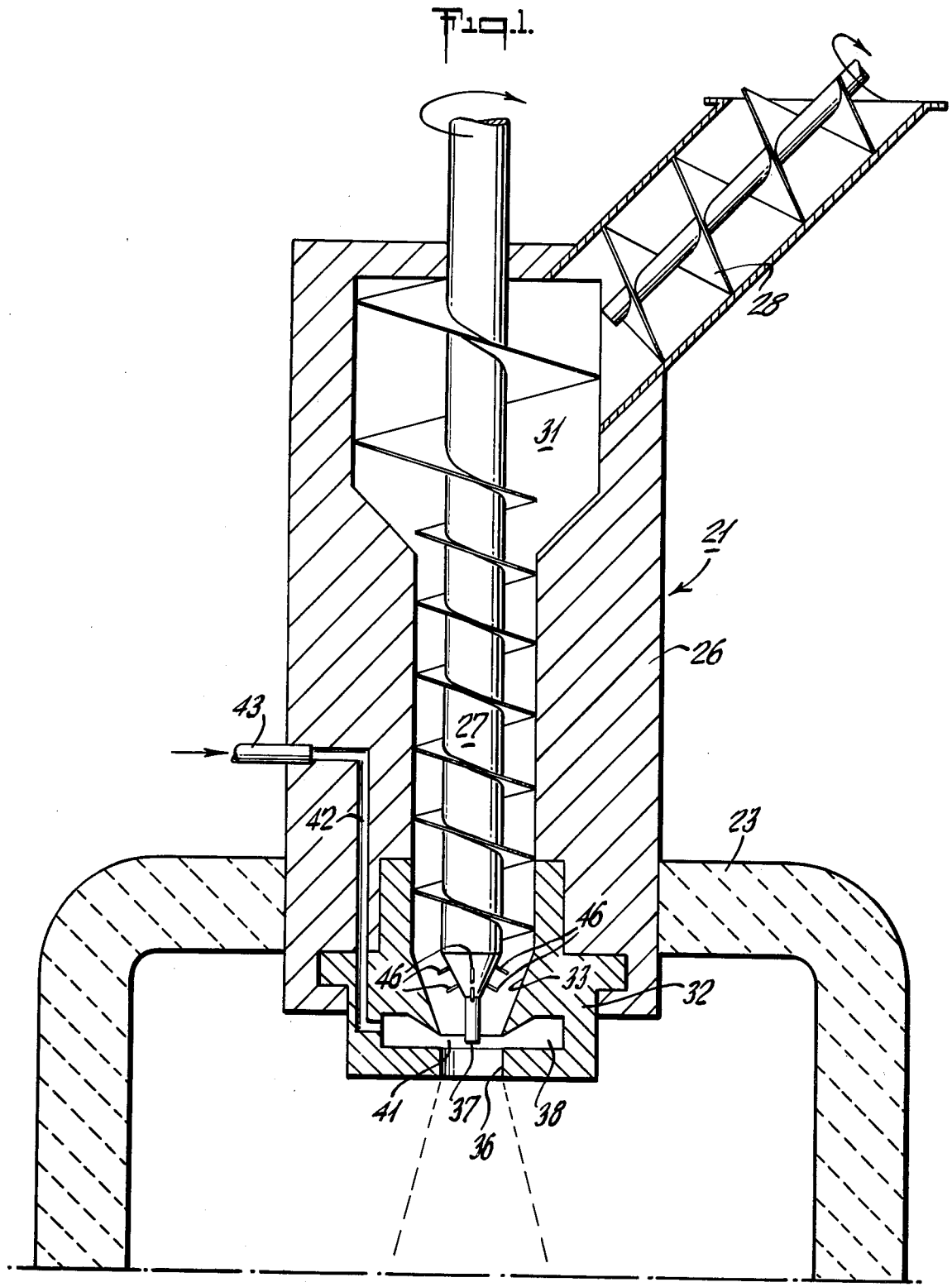
FIG. 1 is a schematic illustration of an extruder in combination with a reactor chamber, in accordance with one modification of the invention.

A preferred embodiment of an extruder structure with its relationship to a high pressure reactor is schematically illustrated in FIG. 1. There is indicated an extruder 21 that is for feeding a finely divided solid (not shown) into a high pressure chamber 22 which is the interior of a reactor 23.

The extruder 21 is obviously only schematically indicated. Such an extruder has a barrel or body portion 26 that encloses a helical screw conveyor section 27. There is a means for feeding the finely divided solids to the conveyor section 27, e.g. a screw type conveyor element 28, that is indicated. The feed conveyor 28, as is indicated, is connected to an upper chamber 31 located in the body 26. And, this may, of course, take various forms, in any feasible manner.

Obviously there must be motive power (not shown) to drive the shaft of the conveyor section 27. This is schematically indicated by the arrow at the top of the shaft, as viewed in FIG. 1.

The extruder 21 includes a nozzle section 32 that is operatively associated with the conveyor section 27. The nozzle 32 includes a tapered passageway 33 that is for compacting the finely divided solids so as to form a barrier against the high pressure which exists in chamber 22 of the reactor 23. It will, of course, be understood that the showing in FIG. 1 is entirely schematic and the tapered passageway 33 may be incorporated into part of the helical conveyor 27 if desired. Also, it will be clear that the degree of taper and other dimensions are entirely schematic.

There is a die 36 at the exit end of the tapered passageway 33 for shaping the compacted solid extrudate. Included in such shaping is a solid cylindrical tip 37 on the end of the helical conveyor 27. Consequently, the compacted solid extrudate will take the form of a hollow cylinder having thin walls.

The nozzle 32 includes means for jetting gas transversely against the thin walls of the hollow cylinder formed by the die 36 along with the inner tip 37. Such means is indicated by an annular chamber 38 that has a circumferential slit 41 which directs an annular jet of gas radially inward toward the tip 37. Also, there is a passageway 42 which connects to the annular chamber 38. The passage 42 may have a tube or pipe 43 connected to the other end thereof for supplying a gas under pressure.

Associated with the tapered passageway 33, there is a means for stirring the compacted extrudate (not shown) in order to prevent blockage in the nozzle section 32. Such means might take various forms, and it is illustrated as a so-called star tip on the solid core of the helical conveyor section 27. The stirring action is created by a plurality of radially extending pins 46.

Figure 2:
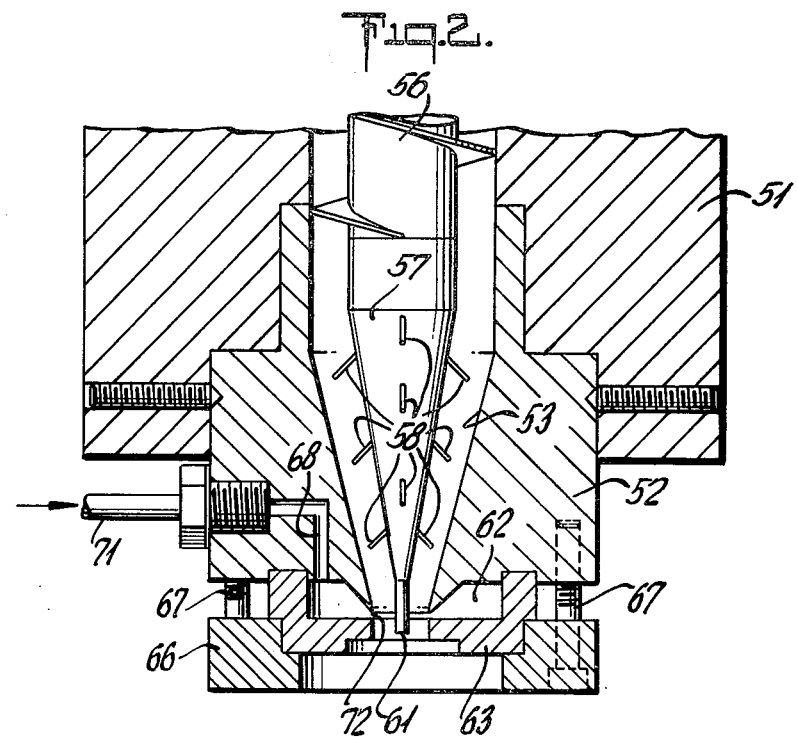
FIG. 2 is another schematic illustration showing the die end of an extruder according to another modification of the invention.

FIG. 2 illustrates a modification in regard to the nozzle and die section of an extruder according to the invention. Thus, there is indicated a barrel or body 51 of the extruder, and there is mounted therein a separate nozzle section 52, which in turn has a tapered passageway 53 therein. It will be noted that the illustration is quite schematic, as is the case with all of the various modifications shown.

In this case, a helical conveyor 56 has a rotatable core with a star tipped end 57. The star tip is formed by a plurality of radially extending pins 58, and in this case, as in the FIG. 1 arrangement, there is a cylindrical tip or extension 61 that acts to form a hollow center in the extrudate as it is shaped at the end of the tapered passageway 53. Again, there is an annular chamber 62, but it is formed by a ring 63 that is clamped in place on the nozzle section 52. The clamping is effected by means of an outer ring 66 with bolts 67, as indicated.

There is a passage 68 for supplying gas to the chamber 62, and a pipe or tube 71 is connected to the passage 68. Also, there is an annular jet opening or slit 72 that directs gas flow radially inward towards the extrudate that will form in the die end of the nozzle 52 opposite the extension 61.

Figure 3:
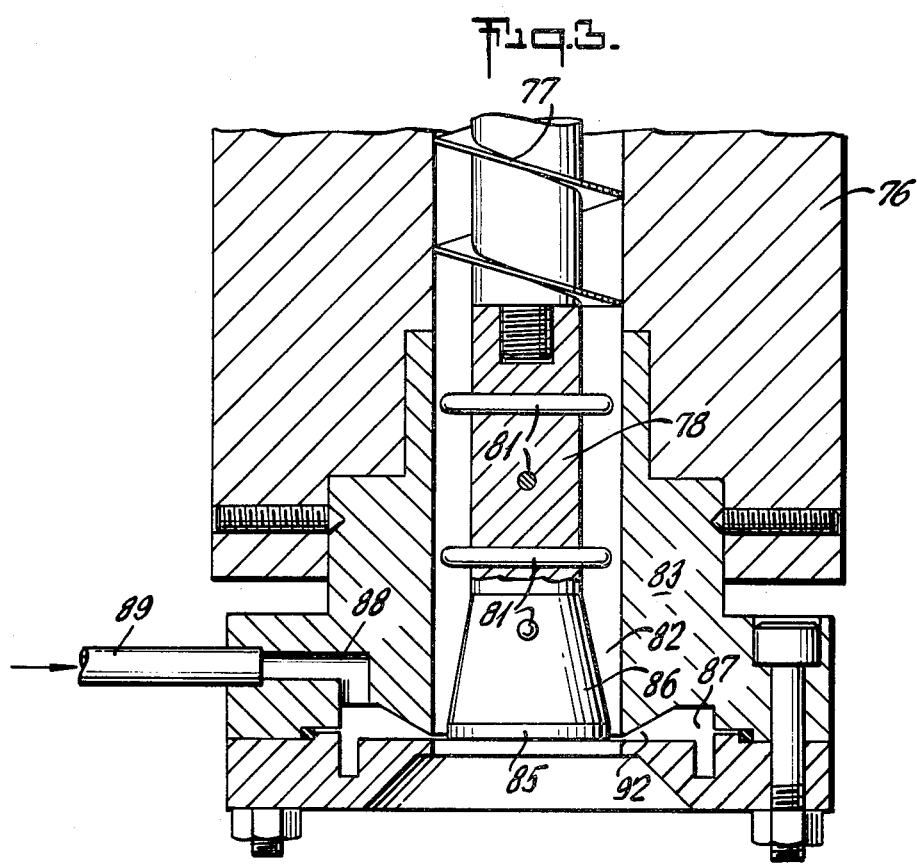
FIG. 3 is a schematic illustration, partly in cross section, showing a different embodiment of the die with gas jet elements, according to a different modification of the invention.

FIG. 3 is another schematic cross sectional showing. This is a different embodiment of the nozzle section of an extruder according to the invention. In this case, a barrel or body section 76 encloses a conveyor 77 that has a star tip 78 attached thereto. The tip 78 may be detachable, as indicated by the longitudinal cross section portion shown. Also, there are pins 81 to provide the stirring action which was described above. These pins may be mounted diametrically through the tip 78 at right angles to one another.

In this case, a tapered passageway 82 is formed by an annular space between a nozzle 83 and a diverging end 86 of the star tip 78. Also, there is a short cylindrical extension 85 on the diverging tip 86. This forms the die to shape the extrudate into a hollow cylinder as before.

There is an annular chamber 87 that has a passage 88 connected therewith, and a tube 89 at the other end of the passage 88 for supplying a gas to the chamber 87. Here again, in a similar manner as with the foregoing modifications, there is an annular jet opening or slit 92 to direct a gas transversely (radially inward) against the hollow extrudate that forms around the diverging tip 86. As before, this acts to repulverize the finely divided solids which are being extruded through the nozzle 83 while the compacted extrudate prior to repulverization acts to contain the high pressure in the reactor (indicated in FIG. 1).

FIG. 4 illustrates another modification of the nozzle and related elements for an extruder according to the invention. In this case, a barrel or body portion 96 contains a conveyor 97 that feeds the solid fines to a tapered passageway 98. As with the other modifications, there are radially extending pins 101 that act to stir the extrudate just before it moves into a die section 102.

It will be clear to anyone skilled in the art that in this, and all of the illustrations for the various modifications according to the invention, the illustrations are quite schematic and particularly with regard to the passageway containing the conveyor and the tapered end thereof. Thus, it will be understood that the dimensions and arrangement may be radically different from these illustrations.

In FIG. 4, there are two different means for using gas to break up the extrudate upon exit from the die. Thus, in addition to an annular chamber 103 which has a pipe 104 connected therewith for supplying the gas, there is another gas supply pipe 107 that extends diametrically across the die section 102 and has a port 108 on the side toward the exit end of the die section 102. It has been found that the extrudate flows through the die section 102 around the pipe 107 and closes on the downstream side. At the same time, the gas that is flowing through the port 108 becomes incorporated in the extrudate. The other gas flow for repulverizing the extrudate, is similar to the earlier described modifications. There is a jet slit 109 that directs the gas transversely, radially inward against the extrudate flowing through the lower end of the die section 102.

It may be noted that the various elements may be constructed in any feasible manner, and by way of schematic indication, there is shown a pair of set screws 112 and 113 that are situated in the barrel 96. These will hold the nozzle containing the passageway 98, in place. Also, the die section 102 has the body thereof attached to the nozzle by square threads 111, as illustrated. And, at the lower end of the die section 102, there is a ring 114 that is bolted in place and clamps over a gasket 115 which may have variable thickness for determining the size of the jet slit 109.

FIG. 5 illustrates another modification. This is essentially like the FIG. 4, but without the arrangement for introducing gas into the extrudate within the die section. Thus, in FIG. 5, there is a barrel 118 which contains a conveyor 119 and a nozzle section 120 which in turn includes a tapered passageway 121. As before, there is a star tip portion on the conveyor with a plurality of pins 124 for carrying out the stirring function. Also, there is an annular chamber 125 for the gas that is to be introduced. A pipe 126 is for supplying gas to the chamber 125, while a jet slit 127 applies a jet flow of gas against the extrudate.

In this modification, the annular chamber 125 is formed between an inner ring 130 and an outer ring 131. They are both attached with square threads, as indicated. In this case, the width of the jet slit 127 will be set by the thickness of a gasket 132 that is between the outer ring 131 and the nozzle section 120.

Figure 6:
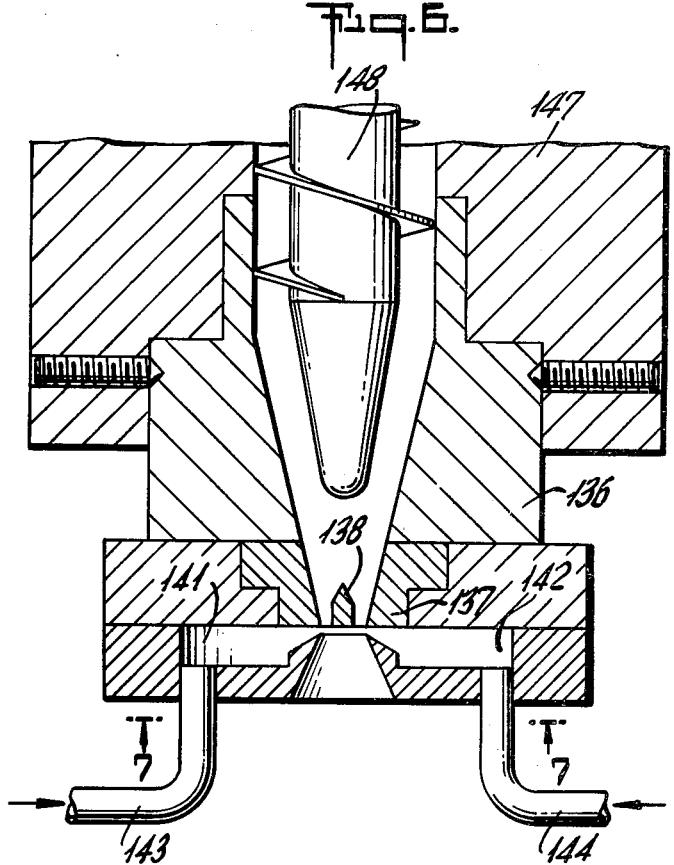
FIG. 6 is a schematic longitudinal cross section, showing the die which has a ribbon forming structure for the extrudate.
Figure 7:
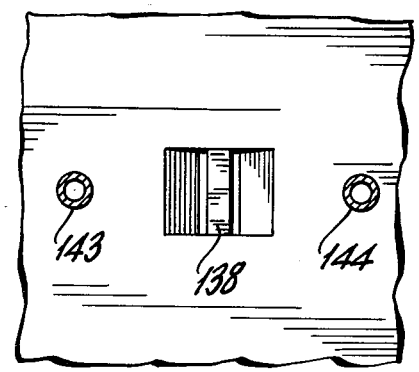
FIG. 7 is a detail bottom plan view taken along the lines 7—7 on FIG. 6, locking in the direction of the arrows.

FIGS. 6 and 7 schematically illustrate another form of nozzle and die for obtaining an extrudate with a thin cross section shape. Thus, in this case, nozzle section 136 ends with a rectangular shaped die 137 that forms a pair of thin flat ribbons of extrudate. This is accomplished by having a central splitter 138 at the exit end of the die 137. In this case, there may be two chambers 141 and 142 for supplying the gas to be jetted against the extrudate. And, there is indicated a pair of pipes 143 and 144, respectively, for supplying the gas to the chambers 141 and 142.

Here again, the various elements are quite schematically illustrated and, as in the other modifications, the elements such as a barrel 147 and a conveyor 148 are indicated in a similar manner as in the other modifications.

Figure 8:
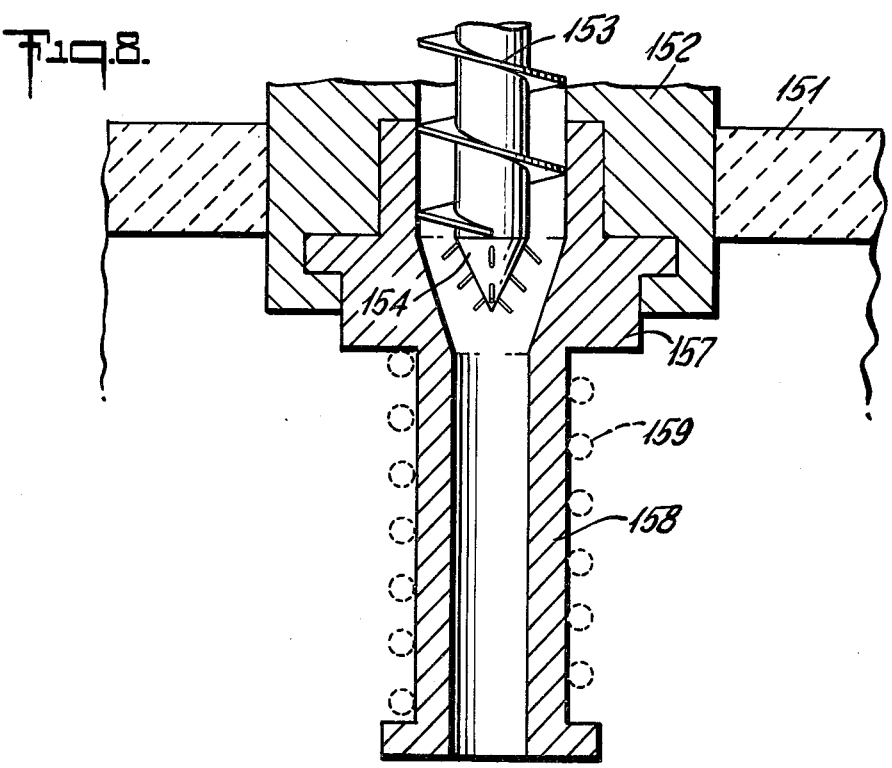
FIG. 8 is a schematic longitudinal cross section, showing a modification of the invention for applying heat to the compacted extrudate prior to its entry into a reaction chamber.

FIG. 8 schematically illustrates a modification which employs a different type of structure to obtain the repulverization of the extrudate.

The FIG. 8 illustration includes a reactor wall 151, in which is mounted a barrel or body section 152 of the extruder illustrated. The extruder includes the usual conveyor 153 with a star tip end 154. In this case, a die 157 has an elongated end 158 which is surrounded by a heating coil 159 that is indicated in dashed lines. This modification provides structure for repulverizing the extrudate by flash heating. The heat is applied as the extrudate passes through the heater section 158 of the die and it is at a high enough temperature to explosively form steam from the water content in the extrudate.

Figure 9:
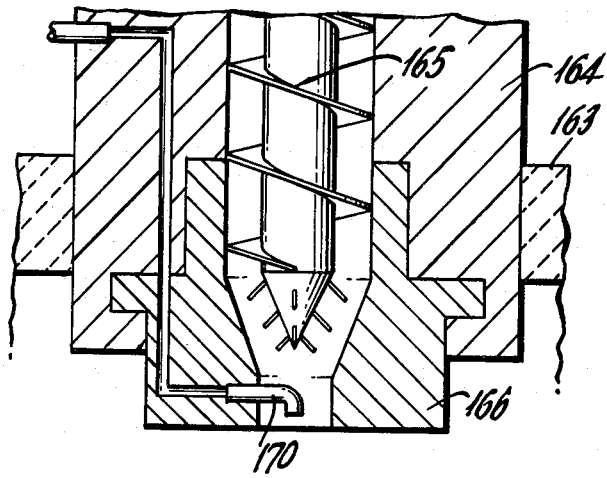
FIGS. 9, 10 and 11 are further schematic illustrations showing in longitudinal cross section three additional modifications of the structure for an extruder and die combination, according to the invention.
Figure 10:
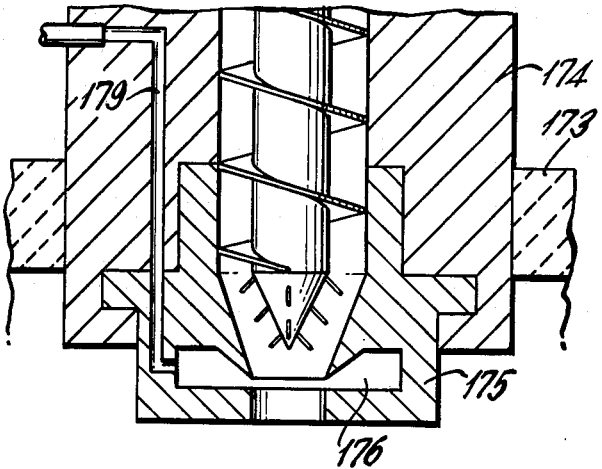
Figure 11:
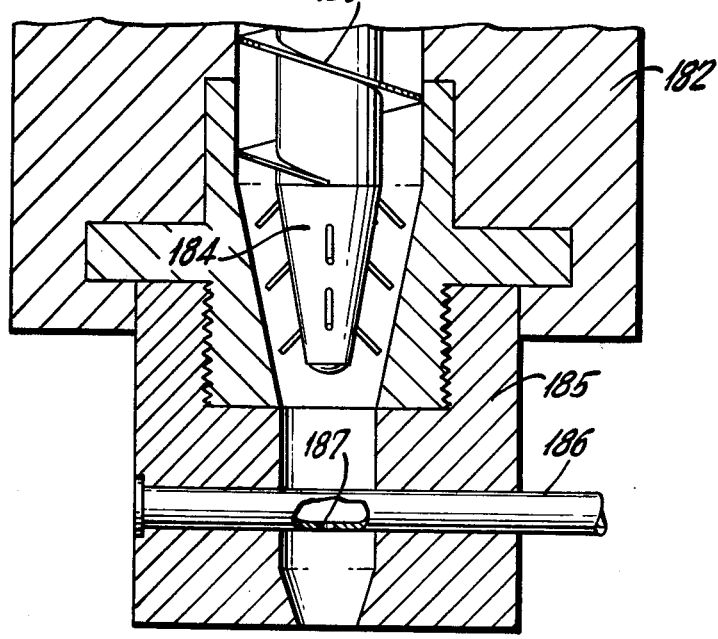

FIGS. 9, 10 and 11 show further modifications and/or variations of the various elements that have been described previously. Thus, in FIG. 9, there is shown a reactor wall 163 in which there is mounted a barrel 164 of an extruder that has a conveyor 165 for feeding a die section 166. In this case, the gas is introduced through a passage 169 that leads to a bent tube 170 which exits axially within the exit end of the die 166.

In FIG. 10, there is illustrated a reactor wall 173 and an extruder barrel 174 which contains a die section 175 having an annular gas chamber 176 therein. A passage 179 is connected to the annular chamber 176 for introducing the gas thereto.

Finally, FIG. 11 illustrates the end of an extruder barrel 182 containing a conveyor 183 with a star tip ending 184 for feeding extrudate through a die section 185. The die 185 has a diametrically situated tube 186 with a port 187 in one wall thereof. This port is located on the side toward the exit opening of the die 185.

METHOD

The invention also encompasses a method that is applicable to coal gasification or the like, where a high pressure reactor is employed. The method is for charging solids into the reactor in a continuous manner, and it comprises the following steps.

Feeding of the said solids in a finely divided form with about 15-40 percent by weight of water. This is carried out through an extruder in order to form an extrudate capable of withstanding the said reactor pressure at the discharge end of the extruder. This step is indicated by the various modifications and/or forms of apparatus illustrated. It will be appreciated by anyone skilled in the art that the finely divided solids, e.g. powdered coal, will have been formed by a conventional mill or the like, while thereafter having been fed in any convenient manner (such as through the feed conveyor 28 illustrated in FIG. 1) to the conveyor section of an extruder.

It has been discovered that by using the extrusion step, a high solid-to-water ratio may be employed. Consequently, the thermal efficiency of the total operation is greatly improved.

Another step in the method is that of stirring the extrudate at the discharge end of the extruder in order to prevent blocking thereof. This step is self-evident in connection with the illustrated showings which, of course, are quite schematic. Thus, the star tip pins do the stirring of the extrudate as the conveyor section is rotated during the extrusion process.

Finally, the method includes the step of repulverizing the extrudate upon discharge from the said discharge end of the extruder, in order to have improved reaction of the extrudate to produce a product gas mixture. This step may be carried out by jetting a reactant gas transversely against the extrudate as it emerges from the die, and various of the modifications illustrated would carry out such a step. However, other means of repulverizing in accordance with this step might include the injecting of a gas into the extrudate prior to discharge thereof from the die, e.g. see FIGS. 4, 9 and 11. In such case, of course, the gas should be under pressure greater than the reactor pressure into which the extrudate is being ejected, although the same applies to the jetting of reactant gas.

Another way of repulverizing is that indicated by FIG. 8. Thus, it acts to heat the extrudate sufficiently to explosively vaporize the water component, prior to discharge of the extrudate. In such case, the gas which acts to carry out the step of repulverizing, is steam and the reaction gas would have to be introduced separately.

While various modifications of the invention have been described above in considerable detail in accordance with the applicable statutes, this is not to be taken as in any way limiting the invention, but merely as being descriptive thereof.

We claim:

1. In coal gasification employing a high pressure reactor, a method of charging solids into the reactor in a continuous manner, comprising the steps of
    feeding said solids in a finely divided form with about 15–40 percent by weight of water through an extruder to form an extrudate capable of withstanding said reactor pressure at the discharge end of said extruder,
    stirring said extrudate at said discharge end of said extruder to prevent blocking thereof, and
    repulverizing said extrudate upon discharge from said discharge end for reacting to produce a product gas mixture.

2. In coal gasification, a method according to claim 1, wherein
    said repulverizing comprises
    jetting a reactant gas transversely against said extrudate.

3. In coal gasification, a method according to claim 1, wherein
    said repulverizing comprises
    injecting a gas into said extrudate prior to discharge thereof,
    said gas being under pressure greater than said reactor pressure.

4. In coal gasification, a method according to claim 1, wherein
    said repulverizing comprises heating said extrudate sufficiently to explosively vaporize said water component prior to discharge of said extrudate.

5. In coal gasification employing a high pressure reactor, a method of charging solids into the reactor in a continuous manner, comprising the steps of
    feeding said solids in a finely divided form with about 15–40 percent by weight of withstanding said reactor pressure at the discharge end of said extruder,
    stirring said extrudate at said discharge end of said extruder to prevent blocking thereof, and
    repulverizing said extrudate upon discharge from said discharge end by directing a jet of reactant gas radially inward against said extrudate.

* * * * *

UNITED STATES PATENT AND TRADEMARK OFFICE
CERTIFICATE OF CORRECTION

PATENT NO. : 4,218,222

DATED : August 19, 1980

INVENTOR(S) : J. T. Nolan, Jr.; M. A. McMahon; R. V. Kessler; R. J. Corbeels

It is certified that error appears in the above—identified patent and that said Letters Patent is hereby corrected as shown below:

Column 8, line 35 (Claim 5, line 5): After "weight of"

insert

--water through an extruder to form an extrudate capable of--

Signed and Sealed this

Eighteenth Day of November 1980

[SEAL]

Attest:

Attesting Officer

SIDNEY A. DIAMOND

Commissioner of Patents and Trademarks